US008727033B2

(12) United States Patent
Kovach et al.

(10) Patent No.: US 8,727,033 B2
(45) Date of Patent: May 20, 2014

(54) APPARATUS FOR PROVIDING SUPPORT OF A CANTILEVERED COMPONENT MOUNTED TO A RIGID FRAME

(75) Inventors: Michael G. Kovach, Morton, IL (US);
Timothy Olson, Shorewood, IL (US);
Troy L. Cooper, Goodfield, IL (US);
Marvin Kuebler, Goodfield, IL (US);
Scott Lang, Washington, IL (US); Klint Peterson, Mackinow, IL (US); Ricky Gerber, Roanoke, IL (US)

(73) Assignee: CNH Industrial America LLC, New Holland, PA (US)

( * ) Notice: Subject to any disclaimer, the term of this patent is extended or adjusted under 35 U.S.C. 154(b) by 859 days.

(21) Appl. No.: 12/537,799

(22) Filed: Aug. 7, 2009

(65) Prior Publication Data

US 2011/0030979 A1 Feb. 10, 2011

(51) Int. Cl.
*A01B 15/10* (2006.01)
*A01B 49/02* (2006.01)

(52) U.S. Cl.
USPC ............................ 172/762; 172/150; 172/170

(58) Field of Classification Search
USPC ......... 172/117, 349, 551, 574, 682, 762, 170, 172/519, 537, 146, 147, 150, 149, 681; 404/122, 125, 126, 127, 132
See application file for complete search history.

(56) References Cited

U.S. PATENT DOCUMENTS

| | | | |
|---|---|---|---|
| 590,380 A | 9/1897 | Scheid | |
| 3,268,280 A | 8/1966 | Miller | |
| 3,711,168 A | 1/1973 | Wendel et al. | |
| 3,910,651 A | 10/1975 | Pearce et al. | |
| 3,950,964 A | 4/1976 | Alexeeva et al. | |
| 3,997,175 A | 12/1976 | Geary | |
| 3,997,805 A | 12/1976 | Dochterman | |
| 4,000,932 A | 1/1977 | Harris et al. | |
| 4,061,279 A | 12/1977 | Sautter | |
| 4,099,799 A | 7/1978 | Etsion | |
| 4,456,407 A | 6/1984 | Shaturov et al. | |
| 4,703,809 A * | 11/1987 | Van den Ende | 172/147 |
| 4,872,767 A | 10/1989 | Knapp | |
| 4,905,771 A * | 3/1990 | Stark | 172/572 |
| 5,144,251 A | 9/1992 | Fasching et al. | |
| 5,215,385 A | 6/1993 | Ide | |
| 5,304,006 A | 4/1994 | Ide | |
| 5,364,191 A | 11/1994 | Gruber | |
| 5,513,917 A | 5/1996 | Ide et al. | |
| 5,558,444 A | 9/1996 | Ide | |
| 5,632,343 A * | 5/1997 | Gengler | 172/552 |
| 6,068,061 A * | 5/2000 | Smith et al. | 172/139 |
| 6,554,078 B1 * | 4/2003 | McDonald | 172/69 |
| 6,763,896 B1 * | 7/2004 | Hurtis | 172/149 |
| 6,834,879 B1 * | 12/2004 | Lorman | 280/506 |
| 6,871,709 B2 * | 3/2005 | Knobloch et al. | 172/145 |
| 6,986,519 B2 | 1/2006 | Smith | |
| 7,017,675 B2 * | 3/2006 | Ankenman et al. | 172/146 |
| 7,156,186 B2 * | 1/2007 | Knobloch et al. | 172/701 |
| 2003/0196823 A1 * | 10/2003 | McDonald | 172/146 |
| 2004/0016554 A1 * | 1/2004 | McDonald | 172/146 |
| 2008/0006447 A1 | 1/2008 | Dillard et al. | |

* cited by examiner

*Primary Examiner* — Matthew D Troutman
(74) *Attorney, Agent, or Firm* — Rebecca L. Henkel

(57) ABSTRACT

An apparatus for reducing the stresses placed on a cantilevered component mounted to a rigid frame includes cushioned bushings coupling the cantilevered component to a rigid frame. As the cantilevered component is loaded due to bending moments, the cushioned bushings flex and cushion the cantilevered component. The cantilevered component is retained within the bushing using hardware that allows the cantilevered component to float as needed to further reduce stresses and strains thereon.

14 Claims, 4 Drawing Sheets

APPARATUS FOR PROVIDING SUPPORT OF A CANTILEVERED COMPONENT MOUNTED TO A RIGID FRAME

BACKGROUND OF THE INVENTION

The present invention relates generally to tillage implements and, more particularly, to tillage implements using rotary blades or reels that are mounted to a rigid frame by cantilevered members, such as spindles.

It is well known that to attain the best agricultural performance from a piece of land, a farmer must cultivate the soil, typically through a tilling operation. Common tilling operations include plowing, harrowing, and sub-soiling. Modern farmers perform these tilling operations by pulling a tilling implement behind a motorized tractor. Depending on the crop selection and the soil conditions, a farmer may need to perform several tilling operations at different times over a crop cycle to properly cultivate the land to suit the crop choice.

In one type of tilling operation, rows or gangs of discs are pulled through soil at depths between 3 and 6 inches to break up clods or lumps of soil, as well as old plant material to provide a more amenable soil structure for planting and level the soil surface.

The configuration of the tilling implement gangs and their constituent discs will determine the quality and quantity of the passes required to effectively till an area of soil. For example, a gang of parallel flat discs pulled through the soil, oriented such that their axis of revolution is perpendicular to the direction of pull, will not be very effective at tilling the soil. To improve the tilling action, those skilled in the art have attempted to change the angle at which the gang is oriented. However, an increased gang angle can cause complications. The increased gang angle will leave large clods of soil that may require multiple passes to pulverize. Additionally, the side pressure of the soil against the sides of flat discs or discs having only a shallow concavity of 1.25 to 1.69 inches will often break the discs. To increase disc strength, the disc can be made to be more concave. However, increasing the concavity of the discs to improve their strength promotes the formation of an undesirable compaction layer.

Thus, tilling implements involving discs have a number of drawbacks. First, multiple passes of the tilling implement over the same area of soil may be required to properly cultivate the soil and cut through heavy crop residue. If multiple passes are required, then the farmer will incur increased costs associated with the amount of time and fuel required to prepare the seedbed. Known tilling implements are limited to speeds below approximately 6 miles per hour. Speeds in excess of approximately 6 miles per hour will vertically lift the tilling implement, resulting in the blades engaging the soil by less than 3 to 6 inches. If this occurs, the blades will not effectively till the soil or, if the blades are forced to remain in the soil, it can result in increased disc failure due to the increased pressure applied to the discs by the soil at greater velocities.

Second, existing cultivators compact the soil under the prepared seedbed. This layer of compacted soil inhibits plant germination, root growth, and crop yield. The presence of a compacted layer of soil may require an additional tillage operation such as plowing to break up the compacted earth in order to avoid the problems of poor water absorption and weak anchoring of crops in the ground.

Accordingly, a vertical tillage system has been developed incorporating fluted-concave disc blades, such as described in U.S. Publ. No. 2009/013388, the disclosure of which is incorporated herein. As described therein, the vertical tillage system utilizes a set of rolling basket assemblies supported by a frame that also carries the fluted-concave disc blades and that are designed to provide a downward force on the frame. The rolling basket assemblies include reels that are designed to rotate as the frame is pulled by a towing vehicle, e.g., tractor. As the reels rotate, they penetrate and preferably explode clumped soil and/or crop residue.

The reels or rotating baskets are generally mounted to the frame through a rotational coupling that allows the reels to rotate as the frame is being towed. The rotational coupling typically includes a spindle that is cantilevered from the frame. In one known implementation, the spindle is weld to the frame. While generally effective in attaching the spindle to the frame, the weld joint, as well as the spindle itself, can fatigue over time. Moreover, it has been found that operating the tillage system at faster towing speeds during in-field use or transport, or with larger loads, can hasten the fatigue and ultimately the premature failure of the weld joints and the spindle. As farmers are increasingly demanding implements, such as vertical tillage systems, that can be towed through the field or transported at faster speeds and/or with greater loads, the additional strain and stresses placed on the cantilevered components, and the weld joints, must be addressed to reduce the premature failure of these components and, ultimately, the implement itself.

SUMMARY OF THE INVENTION

The present invention is directed to an apparatus for reducing the stresses placed on a cantilevered component mounted to a rigid frame. The inventors have found that additional stresses and strains placed on the cantilevered components, such as spindles, pivots, and shafts, associated with increased operating speeds and/or loads of the implement can be mitigated by cushioned bushings coupling the cantilevered components to the rigid frame. As the cantilevered component is loaded due to bending moments, the cushioned bushings flex and cushion the cantilevered component. The cantilevered component is retained within the bushing using hardware that allows the cantilevered component to float as needed to further reduce stresses and strains thereon.

Therefore, in accordance with one aspect of the invention, a reel mounting assembly for use with a tillage implement is provided. The mounting assembly includes a mounting arm having an axially extending cylinder and configured to be coupled to a frame of the tillage implement. A cushioned bushing is retained within the cylinder. A spindle is coupled to the cushioned bushing and a reel is coupled to the spindle and configured to rotate about the spindle. The cushioned bushing is configured to flex when the spindle is loaded to reduce stress on the spindle.

In accordance with another aspect of the invention, a tillage implement is provided and includes a frame having a tow bar adapted to be coupled to a prime mover and a mounting arm coupled to the frame. The implement further includes a reel adapted to pulverize crop residue present on a field surface and a spindle arrangement coupling the reel to the mounting arm. The spindle arrangement includes flexible components configured to flex when the spindle arrangement is loaded due to bending moments.

According to a further aspect of the invention, an agricultural implement includes a frame configured to be towed by a towing vehicle and a member cantilevered from the frame. The invention provides a bushing interconnecting the member and the frame, and formed of cushioning material that is configured to flex and cushion the cantilevered member when the cantilevered member is loaded due to a bending moment.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

The present invention is directed to an apparatus to provide cushioning for a cantilevered component mounted to a rigid frame and will be described as being used with a vertical tillage implement, but it is understood that the invention could be used in other agricultural and non-agricultural applications.

Figure 1:
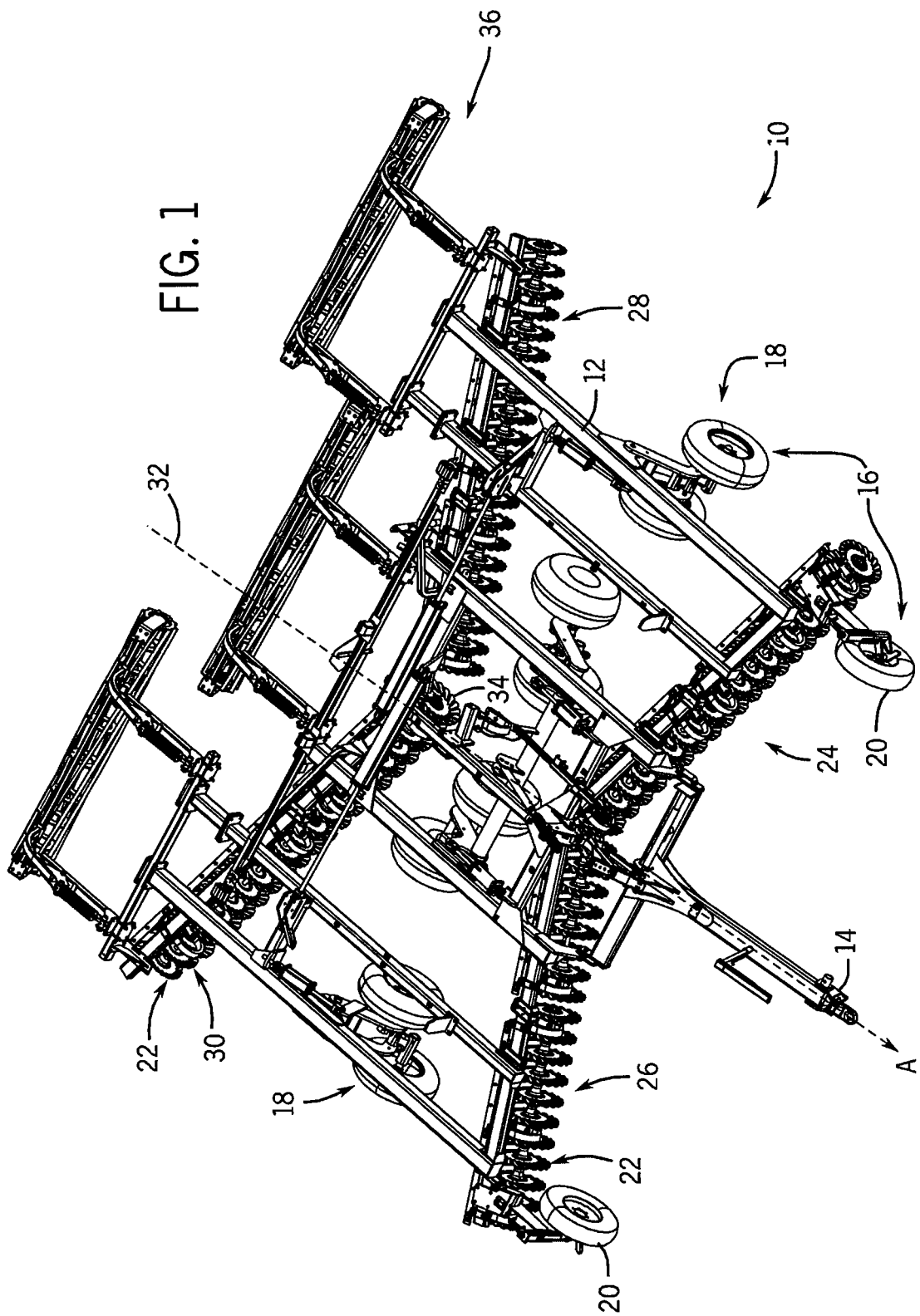
FIG. 1 is an isometric view of a vertical tillage implement incorporating the present invention.

Referring to FIG. 1, a vertical tilling implement 10 is shown. An agricultural vehicle (not shown) pulls the vertical tilling implement 10 in a direction of motion A. The vertical tilling implement 10 includes a main frame 12. The wing frame 12 has a hitch 14 on the front end that may be used to connect the vertical tilling implement 10 to an agricultural vehicle such as a tractor. Additionally, a set of wheels 16 are connected to the wing frame 12. The set of wheels 16 are oriented in a direction that is in general alignment with the direction of motion A. The set of wheels 16 includes a set of center wheels 18 and a set of pivoting wheels 20. The set of center wheels 18 is attached across the wing frame 12 at positions, for example, roughly midway between the front and rear ends of the wing frame 12. The set of center wheels 18 may include a system for adjusting the distance between the main frame 12 and the set of center wheels 18. This system for adjusting may permit the set of center wheels 18 to be statically fixed during the movement of the vertical tilling implement 10 or to be dynamically adjustable as the vertical tilling implement 10 travels. The set of pivoting wheels 20 are connected to the front distal ends of the wing frame 12. As will be described, the set of pivoting wheels 20 may include at least two pivoting wheels that reduce the amount of lateral movement of vertical tilling implement 10 as it is pulled.

The vertical tilling implement 10 also includes a plurality of rows of fluted-concave disc blades 22 attached to the main frame 12. In accordance with one configuration, the plurality of rows of fluted-concave disc blades 22 is indexed. In particular, the plurality of rows of fluted-concave disc blades 22 includes a front left row 24, a front right row 26, a rear left row 28, and a rear right row 30. When indexed, the front left row 24 and the front right row 26 are aligned with the rear left row 28 and the rear right row 30 such that areas of ground between the blades in the front left rows 24 and the front right row 26 are engaged by the blades in the rear left row 28 and the rear right row 30 as the tilling implement is pulled forward.

The fluted-concave disc blades will induce lateral and vertical forces in the vertical tilling implement 10. The fluted-concave disc blades on the plurality of rows of fluted-concave disc blades 22 have surface features, as will be described below. The rotation of the fluted-concave disc blades and the engagement of the surface features of the blades will displace soil during the tilling operation. However, the engagement of the surface features of the blades with the soil will also apply a force to the blades. The blades engagement with the soil will displace the fluted-concave disc blades in a direction perpendicular to the blades direction of rotation.

The front left row 24 is symmetric about a centerline 32 of the vertical tilling implement 10 with the front right row 26. Likewise, the rear left row 28 is symmetric about the centerline 32 of the vertical tilling implement 10 with the rear right row 30. Additionally, the front left row 24 is substantially symmetric about a line perpendicular to the direction of motion A with the rear left row 28. Likewise, the front right row 26 is substantially symmetric about a line perpendicular to the direction of motion A with a rear right row 30. These general symmetries may involve some of the rows being offset relative to the others to achieve the indexing of the blades as described above.

When the plurality of rows of fluted-concave disc blades 22 are arranged in a symmetrical arrangement about the centerline 32, such as illustrated in FIG. 1, a gap between each side of symmetrical rows may be created. A center tilling member 34 may be placed in this gap to ensure that all the soil passing under the vertical tilling implement 10 is tilled as the tilling implement is pulled forward. The center tilling member 34 may be a coulter, as shown in FIG. 1, another fluted disc blade, or the like.

It should be observed that although FIG. 1 only shows four rows included in the plurality of rows of fluted-concave disc blades 22, there may be fewer or more rows of fluted-concave disc blades. Additionally, while the illustrated embodiment shows the plurality of rows of fluted-concave disc blades 22 having an x-shaped configuration based on the described symmetry, the plurality of rows of fluted-concave disc blades 22 may have a different configuration. For example, the plurality of rows of fluted-concave disc blades 22 may have a diamond configuration, a k-shaped configuration, or all may be parallel with each other in a direction perpendicular to the direction of motion A. Furthermore, it is contemplated that some or all of the rows may be configured in asymmetric arrangements.

It should be further observed that the rows may be at oriented at angles of about 18 degrees from a direction perpendicular to the direction of pull. As described above, known tillage implements utilizing typical smooth concave blades would not operate properly under such an aggressive angle and achieve satisfactory results. Historically, flat blades mounted in rows at this aggressive of an angle would break as a result of the massive side pressure of the soil as the tillage implement was pulled and would tend to leave large clods of soil that require a second tilling pass. However, in the disclosed embodiments, the fluted blades are unexpectedly capable of one-pass tilling at this aggressive gang angle despite only having a shallow concavity.

Rolling basket or reel assemblies 36 are connected to the rear end of the main frame 12 to provide downward pressure. Although FIG. 1 shows three rolling basket assemblies 32, two of which having rotational axes which are not collinear with the third, the rolling basket assemblies 32 may include fewer or more members providing downward force.

Figure 2:
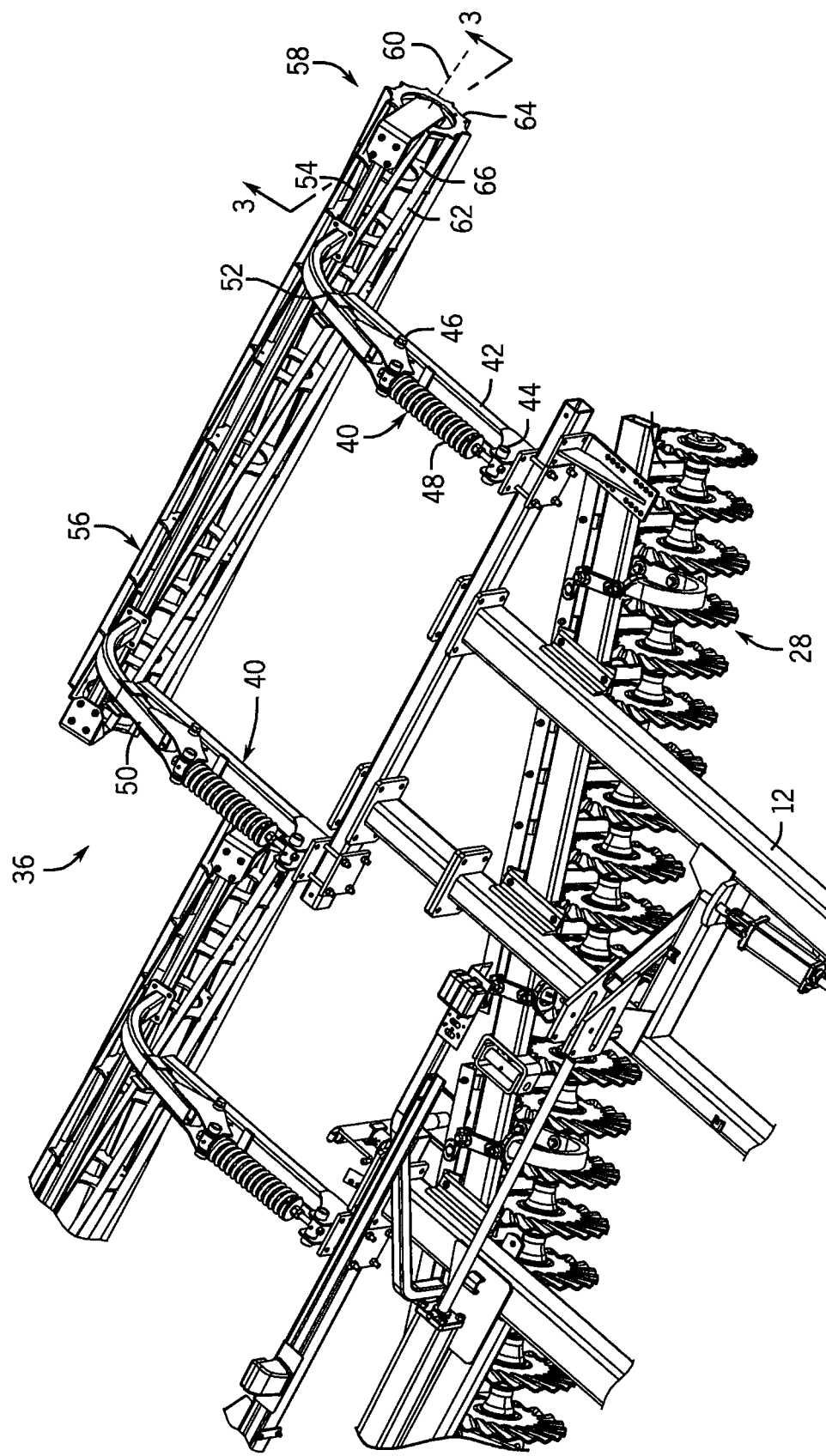
FIG. 2 is a detailed isometric view of a portion of the vertical tillage implement shown in FIG. 1.

Referring now to FIG. 2, a detailed view of the rear left row 28 and the rolling basket assemblies 36 are shown. The rolling basket assemblies 36 are connected to the main frame 12 by an adjustable pressure assembly 38. The adjustable pressure assembly 38 includes a set of arms 40 extending rearwardly from the main frame 12 and downwardly to engage the rolling basket assemblies 36. The set of arms 40 includes a pair of fixed beams 42 which have a set of spring connection points 44 positioned frontwardly on the fixed beams 42 and a set of links 46 that is hingedly connected to the fixed beams 42 near the midpoints of the fixed beams 42. A set of springs 48 run between the set of spring connection points 44 and the set of links 46. The set of links 46 also connect in the rearward direction to a set of L-shaped bars 50. The set of L-shaped bars 50 are positionally adjustable but are also connected to and restricted in movement by a pair of slide bearings 52 located on the set of fixed beams 42 at a point near the rearward ends of the set of fixed beams 42.

The adjustable pressure assembly 38 applies a downward force on the rolling basket assemblies 36. The set of springs 48 may be selected to apply a desired force on the set of links 46. This force will cause the set of links 46 to rotate about their hinged connections to the fixed beams 42 such that the set of L-shaped bars 50 exert more or less downward force into the rolling basket assemblies 36.

The rolling basket assemblies 36 includes a frame 54 extending between the set of arms 50 and about the ends of a rolling basket 56. To this end, the frame 54 engages the rolling basket 56 through a rotational coupling 58, such that the rolling basket 56 is capable of rotating about a rotational axis 60. Although multiple rolling basket assemblies 36 are not required, in the case where there are multiple rolling basket assemblies 36, their respective rotational axes, as illustrated, may be non-collinear. However, it is contemplated that in some applications, it may be desirable for the rotational axes to be collinear.

The rolling basket 56 is formed by a plurality of bars 62 that extend between end caps 64 and around a set of supporting framework rings 66. The end caps 64 engage the rotational coupling 58 to allow the rolling basket assemblies 36 to rotate. As illustrated, it is contemplated that the plurality of bars 62 may have a helical configuration, such that the plurality of bars 62 twists around the cylindrical face of the rolling basket assemblies 36. However, in some configurations, straight or other varied arrangements may be utilized. The plurality of bars 62 may have flat or rounded surfaces. In the illustrated configuration, the plurality of bars 62 has flat surfaces and a rectangular-shaped cross-section. Furthermore, the plurality of bars 62 are mounted between the end caps 64 such that the outermost edge of the diameter of the rolling basket assemblies 36 are the sharp corners of the plurality of bars 62. As such, as the rolling basket assemblies 36 rotate, a sharp corner is designed to impact the ground surface and, thereby, penetrate, and preferably, explode, the clumped soil and/or residue. That is, as the soil passes under the rolling basket assemblies 36 the rolling basket 56 rotates and the edge of the plurality of bars 62 act to both crush the remaining large chunks of earth as well as to level the soil.

Figure 3:
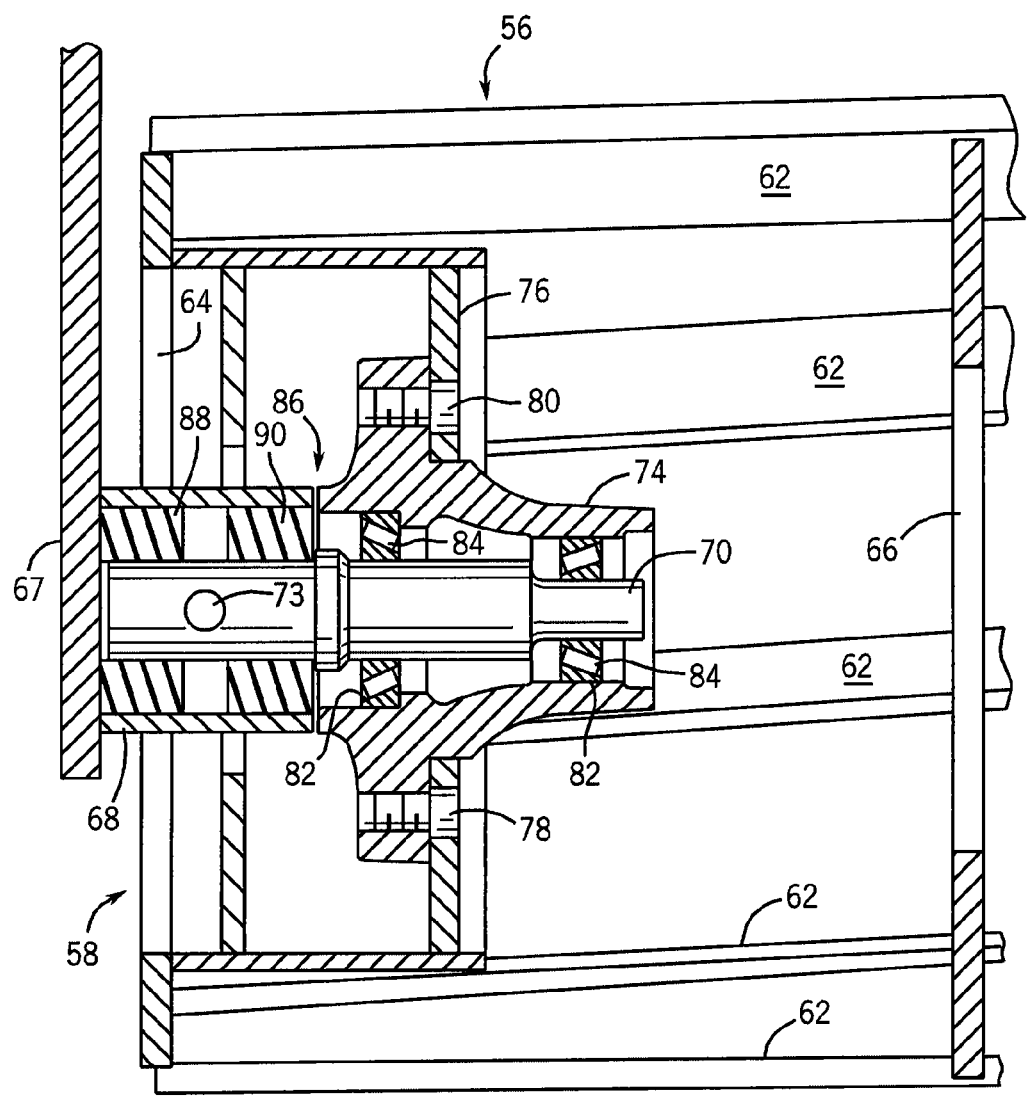
FIG. 3 is a section view of the vertical tillage implement taken along line 3-3 of FIG. 2.
Figure 4:
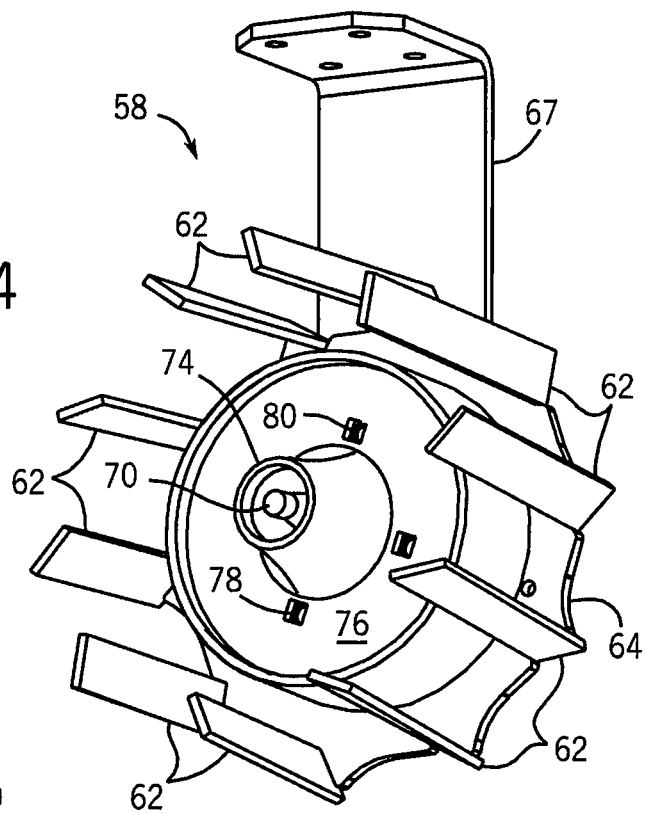
FIG. 4 is a front isometric view of the rotational coupling of a rotating basket to a rigid frame member.
Figure 5:
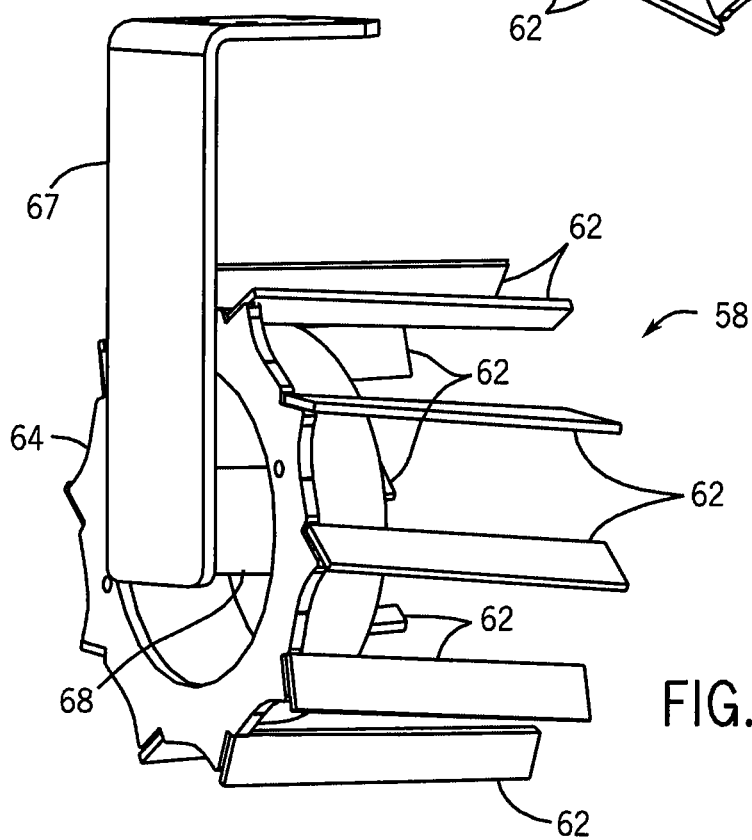
FIG. 5 is a side isometric view of that shown in FIG. 4.

A section view of the rotational coupling 58, taken along line 3-3 of FIG. 2, is shown in FIG. 3. Corresponding isometric view of the rotational coupling 58 are shown in FIGS. 4 and 5. The rotation coupling 58, as noted above, couples the basket 56 to the frame 12. More particularly, the frame 12 includes an arm 67 that carries a rigid, generally cylindrical shaped member 68. The rotational coupling 58 includes a spindle 70 that is coupled to the rigid member 68 by a pin 73. As shown in FIG. 3, the spindle 70 is cantilevered from the arm 66 via the connection to the rigid member 68. The spindle 70 carries a hub 74 to which a basket hub mount 76 (or end cap) is coupled by fasteners 78, 80, such as bolts. The hub 74 is free to rotate around the spindle 70 by interfacing bearings 82, 84. As such, the basket hub mount 76, and thus basket 56, may passively rotate around spindle 70 as the implement 10 is pulled along the field surface. Additionally, as shown in the figure, the hub 74 is carried by the spindle 70 such that a small gap 86 is present between the rigid member 68 and the hub 74, which allows the hub mount 74 to rotate relative to the rigid member 68.

Bushings 88, 90 are interposed between the shaft of the spindle 70 and the inner surface of the rigid member 68. The bearings are comprised of a composite material that flexes to provide cushioning for the spindle 70 when the spindle is loaded due to bending moments. Thus, when the basket 56 is being operated at higher speeds or increased loads, the spindle 70 will be cushioned by the bushings 88, 90 to reduce stress placed on the spindle during such operation. Additionally, as noted above, the spindle 70 is allowed to float relative to the frame 12, which also reduces the stress that would otherwise be placed on the spindle during high speed and/or high load conditions.

While the rotational coupling 58 for only one of the baskets 56 has been described in detail, it is understood that the other rotational couplings, such as the rotational coupling at the opposite end of the basket 56 is similarly constructed. Additionally, while the invention has been described with respect a cantilevered spindle for coupling a reel or a basket to an implement frame, the invention is not limited to such an application.

Many changes and modifications could be made to the invention without departing from the spirit thereof. The scope of these changes will become apparent from the appended claims.

We claim:

1. A reel mounting assembly for use with a tillage implement comprising:
   a mounting arm having a housing and configured to be coupled to a frame of the tillage implement, the housing extending along an axis;
   a cushioned bushing retained within the housing;
   a spindle pivotably coupled to the housing such that the spindle floats relative to the mounting arm;
   a reel coupled to the spindle and configured to rotate about the spindle; and
   wherein the cushioned bushing is configured to flex to reduce stress on the spindle during operation.

2. The assembly of claim 1 wherein the cushioned bushing is comprised of composite materials.

3. The assembly of claim 1 further comprising hardware coupling the spindle to the housing, and wherein the hardware prevents rotational movement of the spindle.

4. The assembly of claim 1 further comprising a reel mounting arrangement coupling the reel to the spindle, wherein the reel mounting arrangement includes bearings that allow the reel to rotate about the spindle, and wherein the reel mounting arrangement further includes a hub mounted to the spindle so that a gap is formed between the hub and the housing.

5. The assembly of claim 4 wherein the housing includes at least one pair of opposed openings and the cushioned bushing includes at least one pair of opposed openings that align with those of the housing, and further comprising at least one pin received within the aligned openings to interconnect the spindle and the housing.

6. The assembly of claim 5 wherein the spindle includes an opening aligned with the openings of the housing and the cushioned bushing.

7. A tillage implement comprising:
a frame having a tow bar adapted to be coupled to a prime mover;
a mounting arm coupled to the frame;
a reel adapted to pulverize crop residue present on a field surface; and
a spindle arrangement extending along an axis and pivotably coupling the reel to the mounting arm so as to prevent rotational movement of the spindle arrangement about the axis, wherein the spindle arrangement includes flexible components configured to flex when the spindle arrangement is loaded due to bending moments.

8. The tillage implement of claim 7 wherein:
the spindle arrangement includes a spindle;
the flexible components include a bushing made of flexible material;
the spindle is mounted to the mounting arm; and
the bushing provides cushioning for the spindle when the spindle is loaded due to bending moments.

9. The tillage implement of claim 8 wherein the mounting arm includes a housing and the bushing is retained within the housing, and further comprising a pin passing through the housing, bushing, and spindle to couple the spindle to the housing.

10. The tillage implement of claim 9 wherein the spindle is retained within the housing in a manner allows limited floating of the spindle relative to the housing.

11. The tillage implement of claim 7 wherein the reel includes a hub that is mounted to the spindle arrangement, and wherein the spindle arrangement includes a bearing assembly that allows the huh to rotate about the spindle.

12. The tillage implement of claim 7 wherein the spindle arrangement includes a spindle that is cantilevered from the mounting arm.

13. An agricultural implement comprising:
a frame configured to be towed by a towing vehicle;
a member extending along an axis, the member being a spindle and being cantilevered from and interconnected to the frame so as to prevent rotational movement of the member about the axis and to allow for pivotable movement of the member relative to the frame;
a bushing disposed between the member and the frame, and formed of cushioning material that is configured to flex and cushion the cantilevered member when the cantilevered member is loaded due to a bending moment; and
a reel adapted for tillage of a field surface, the reel being mounted to the frame by the spindle and being rotatable about the spindle.

14. The implement of claim 13 wherein the reel includes a hub adapted to be mounted to the spindle, and further comprising an adaptor interconnected between the hub and the spindle, the adapter including bearings that allow the adaptor to rotate about the spindle.

* * * * *